US011521506B2

(12) United States Patent
He et al.

(10) Patent No.: US 11,521,506 B2
(45) Date of Patent: Dec. 6, 2022

(54) CALCULATION PRACTICING METHOD, SYSTEM, ELECTRONIC DEVICE AND COMPUTER READABLE STORAGE MEDIUM

(71) Applicant: Hangzhou Dana Technology Inc., Zhejiang (CN)

(72) Inventors: Tao He, Zhejiang (CN); Huan Luo, Zhejiang (CN); Mingquan Chen, Zhejiang (CN)

(73) Assignee: Hangzhou Dana Technology Inc., Zhejiang (CN)

( * ) Notice: Subject to any disclaimer, the term of this patent is extended or adjusted under 35 U.S.C. 154(b) by 451 days.

(21) Appl. No.: 16/705,204

(22) Filed: Dec. 5, 2019

(65) Prior Publication Data

US 2021/0082301 A1    Mar. 18, 2021

(30) Foreign Application Priority Data

Sep. 16, 2019 (CN) .................. 201910872066.2

(51) Int. Cl.
| | |
|---|---|
| G09B 7/02 | (2006.01) |
| G09B 7/04 | (2006.01) |
| G06N 3/02 | (2006.01) |
| G09B 19/02 | (2006.01) |
| G06V 30/412 | (2022.01) |
| G06V 30/413 | (2022.01) |

(52) U.S. Cl.
CPC .............. *G09B 7/04* (2013.01); *G06N 3/02* (2013.01); *G06V 30/412* (2022.01); *G06V 30/413* (2022.01); *G09B 19/025* (2013.01)

(58) Field of Classification Search
CPC ... G09B 7/02; G09B 7/04; G09B 7/07; G09B 7/08; G09B 7/12; G09B 19/025; G06N 3/02
See application file for complete search history.

(56) References Cited

U.S. PATENT DOCUMENTS

2017/0147277 A1* 5/2017 Carney .................. G06F 3/1454
2018/0096619 A1* 4/2018 Fuka ........................ G09B 7/02

* cited by examiner

*Primary Examiner* — Omkar A Deodhar
(74) *Attorney, Agent, or Firm* — JCIP Global Inc.

(57) ABSTRACT

The disclosure provides a calculation practicing method, a system, an electronic device and a computer readable storage medium, the calculation practicing method includes: providing a calculation question; identifying the type and content of the calculation question; generating an answer area according to the type and content of the calculation question; receiving an answering operation in which the user inputs the answer string for the calculation question in the answer area; identifying the answer string inputted by the user; and determining whether each of the answer characters in the answer string is correct, if there is an incorrect answer character, it will be marked, so that the calculation practice can be realized through the electronic device, which is convenient for students to carry out training.

18 Claims, 11 Drawing Sheets

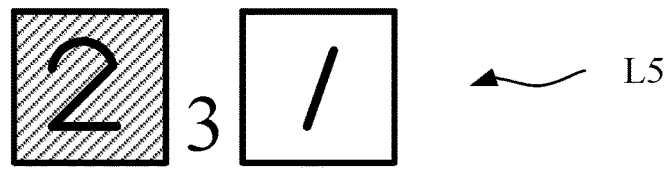
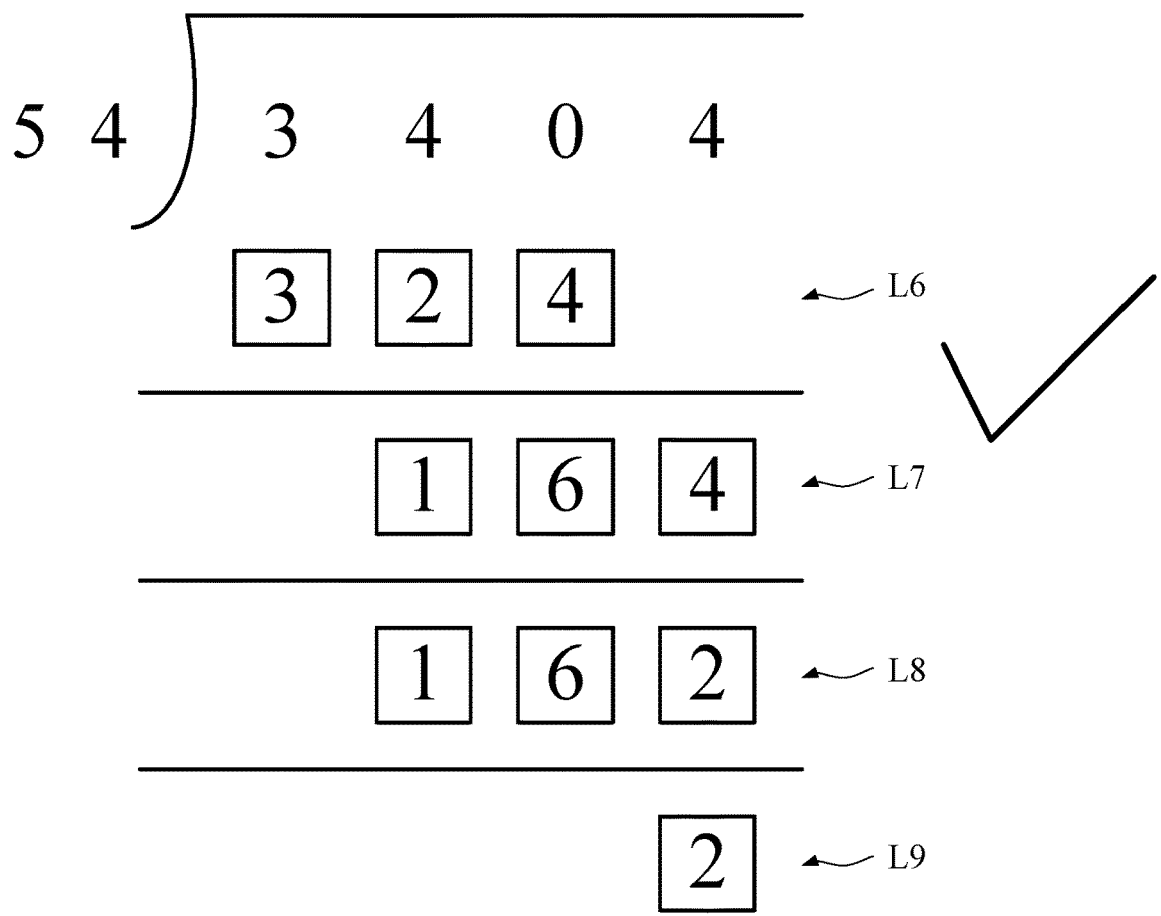
FIG. 10
FIG. 11

$3+8=\boxed{1}\boxed{2}_1$

FIG. 12

$$\begin{array}{r}1\;1\;1\\ \times\quad 3\;2\\ \hline\end{array}$$

FIG. 13

$$\begin{array}{r}1\;1\;1\\ \times\quad 3\;2\\ \hline 2\;2\;2\\ 3\;3\;3\quad\\ \hline 3\;5\;5\;2\end{array}$$

FIG. 14

$21 \times 42 =$

FIG. 15

$21 \times 42 = 88\overset{\frown}{(3)}_2$ $$\begin{array}{r} 2\,1 \\ \times\ \ 4\,2 \\ \hline 4\,2 \\ 8\,4\phantom{0} \\ \hline 8\,8\overset{\frown}{(3)}_2 \end{array}$$

FIG. 16

CALCULATION PRACTICING METHOD, SYSTEM, ELECTRONIC DEVICE AND COMPUTER READABLE STORAGE MEDIUM

CROSS-REFERENCE TO RELATED APPLICATION

This application claims the priority benefit of China application serial no. 201910872066.2, filed on Sep. 16, 2019. The entirety of the above-mentioned patent application is hereby incorporated by reference herein and made a part of this specification.

BACKGROUND

Technical Field

The disclosure relates to the field of artificial intelligence technology, and in particular to a calculation practicing method, a system, an electronic device, and a computer readable storage medium.

Description of Related Art

With the continuous advancement of computer technology and informatization of education, computer technology has gradually been applied to daily education and teaching activities. The main forms of basic education and learning for students are still based on various types of examinations or tests. Under this circumstance, students still need to do a lot of practices to master what they have learned. In mathematics education and learning, a lot of calculation practices are often required to master basic mathematical calculations. At present, students' calculation practices are still mainly conducted on paper. How to combine computer technology to implement practices on electronic devices has become an urgent issue.

SUMMARY

It is a purpose of the present disclosure to provide a calculation practicing method, a system, an electronic device, and a computer readable storage medium for performing calculation practices on an electronic device.

In order to achieve the above purpose, the present disclosure provides a calculation practicing method, the calculation practicing method includes:

Providing a calculation question;

Identifying the type and content of the calculation question;

Generating an answer area according to the type and content of the calculation question;

Receiving an answering operation in which the user inputs an answer string for the calculation question in the answer area;

Identifying the answer string inputted by the user; and

Determining whether each of the answer characters in the answer string is correct, and if there is an incorrect answer character, marking the incorrect answer character.

Optionally, in the calculation practicing method, if there is an incorrect answer character, the correct answer character is also displayed while the incorrect answer character is marked.

Optionally, in the calculation practicing method, after the type of the calculation question is identified, the calculation practicing method further includes:

Determining whether it is necessary to generate a vertical calculation formula according to the type and content of the calculation question, if it is necessary to generate a vertical calculation formula, generating a vertical calculation formula beside the calculation question.

Optionally, in the calculation practicing method, generating an answer area according to the type and content of the calculation question includes: generating a certain number of character filling cells according to the type and content of the calculation question, where the answer area includes the certain number of character filling cells.

Optionally, in the calculation practicing method, generating an answer area according to the type and content of the calculation question includes: generating, according to the type and content of the calculation question and the generated vertical calculation formula, one result row, or one result row and at least two step rows beside the vertical calculation formula.

The result row includes a certain number of character filling cells, the number of cells of the character filling cells is determined according to the type and content of the calculation question; the step row includes a certain number of character filling cells, the number of cells of the character filling cells is determined according to the type and content of the calculation question; the number of rows of the step row is determined according to the type and content of the calculation question.

Optionally, in the calculation practicing method, each of the character filling cells is presented in the form of a box or a horizontal line.

Optionally, in the calculation practicing method, the type and content of the calculation question are identified through a question identifying model, and the question identifying model is a neural network model established through pre-training with samples.

Optionally, in the calculation practicing method, before providing the calculation question, the calculation practicing method further includes:

Providing a calculation question upgrade path, where the calculation question upgrade path includes multiple levels;

Specifically, in the step of providing the calculation question, the calculation question provided is a calculation question in the current level.

Optionally, in the calculation practicing method, in the calculation question upgrade path, the first level has been opened, and the opening of the latter level requires the completion of the previous level; in the current level, if the number the incorrect answer reaches a certain number, the number of calculation questions of the current level is automatically increased.

Optionally, in the calculation practicing method, before the calculation question is provided, the user may select the level of the question to be answered, and in the selected level, if the number of the incorrect answer reaches a certain number, the user is automatically brought to the current level.

Optionally, in the calculation practicing method, when the calculation question is provided, the score of the current level is also provided.

Optionally, in the calculation practicing method, when the calculation question is provided, the number of calculation questions that need to be completed is simultaneously provided.

Optionally, in the calculation practicing method, when receiving an answering operation in which the user inputs the answer string for the calculation question in the answer area, the time for the user to complete the operation is simultaneously provided; or, when receiving the answering operation in which the user inputs the answer string for the calculation question in the answer area, the time taken by the user to perform the operation is limited.

Optionally, in the calculation practicing method, in the step of providing a calculation question, the calculation question is provided by randomly generating a calculation question or randomly extracting a calculation question from a question bank.

Optionally, in the calculation practicing method, the answer string inputted by the user is a print font or a handwritten font.

Optionally, in the calculation practicing method, the first character identifying model is used to identify the print font, and the second character identifying model is used to identify the handwritten font, the first character identifying model and the second character identifying model are neural network models established through pre-training with samples.

The disclosure also provides a calculation practicing system, the calculation practicing system includes:

A question providing module, wherein the question providing module is configured to provide a calculation question;

A question identifying module, wherein the question identifying module is configured to identify the type and content of the calculation question;

An answer area generating module, wherein the answer area generating module is configured to generate an answer area according to the type and content of the calculation question;

An answering module, wherein the answering module is configured to receive an answering operation in which the user inputs an answer string for the calculation question in the answer area;

An answer identifying module, wherein the answer identifying module is configured to identify the answer string inputted by the user; and A determining module, wherein the determining module is configured to determine whether each of the answer characters in the answer string is correct, and if there is an incorrect answer character, marking the incorrect answer character.

Optionally, in the calculation practicing system, the calculation practicing system further includes: a question checking module, wherein the question checking module is configured to determine, according to the type and content of the calculation question, whether a vertical calculation formula needs to be generated, if a vertical calculation formula needs to be generated, generating a vertical calculation formula beside the calculation question.

The present disclosure also provides an electronic device including a processor, a memory, and a display;

The memory is configured to store a computer program;

The processor is configured to execute the computer program to implement any one of the above methods; and The display is configured to display results of executing the computer program.

The present disclosure also provides a computer readable storage medium which stores a computer program, the computer program is executed by a processor to implement any one of the above methods.

In the calculation practicing method, the system, the electronic device and the computer readable storage medium provided by the present disclosure, the calculation practicing method includes: providing a calculation question; identifying the type and content of the calculation question; generating an answer area according to the type and content of the calculation question; receiving an answering operation in which the user inputs the answer string for the calculation question in the answer area; identifying the answer string inputted by the user; and determining whether each of the answer characters in the answer string is correct, if there is an incorrect answer character, the incorrect answer character will be marked, so that the calculation practice can be realized through the electronic device, which is convenient for students to carry out training. Meanwhile, by determining whether each of the answer characters in the answer string is correct, if there is an incorrect answer character, it is marked, which is convenient for students to understand the result of the calculation practice as soon as possible, and in addition, since teachers do not need to perform manual correction, the burden on teachers is also reduced.

BRIEF DESCRIPTION OF THE DRAWINGS

FIG. 10 is a schematic diagram of a calculation question according to still another embodiment of the present disclosure.

FIG. 11 is a schematic diagram of a calculation question according to yet another embodiment of the present disclosure.

FIG. 12 is a schematic diagram of a calculation question according to still another embodiment of the present disclosure.

FIG. 13 is a schematic diagram of a calculation question according to yet another embodiment of the present disclosure.

FIG. 14 is a schematic diagram of a calculation question according to still another embodiment of the present disclosure.

FIG. 15 is a schematic diagram of a calculation question according to yet another embodiment of the present disclosure.

FIG. 16 is a schematic diagram of a calculation question according to still another embodiment of the present disclosure.

DESCRIPTION OF THE EMBODIMENTS

The calculation practicing method, the system, the electronic device and the computer readable storage medium provided by the present disclosure are further described in detail below with reference to the accompanying drawings and specific embodiments. Advantages and features of the present disclosure will be more apparent with reference to the following description and claims. It should be noted that the drawings are illustrated in a very simplified form and all are presented in non-precise proportions, and only serve to facilitate clearly explaining the purpose of the embodiments of the present disclosure.

In the terms of the present application, "side" may mean that the first object is located in the surrounding area, e.g., the upper side, the lower side, the left side, and the right side of the second object, and may also include, for example, the upper right corner and the lower right corner. Specifically, the present disclosure provides no limitation to the distance between the first object and the second object. Generally speaking, the distance between the first object and the second object is smaller than the distance between two adjacent second objects (if there are two second objects adjacent to each other). Preferably, the distance between the first object and the second object is measured by centimeters.

Figure 1:
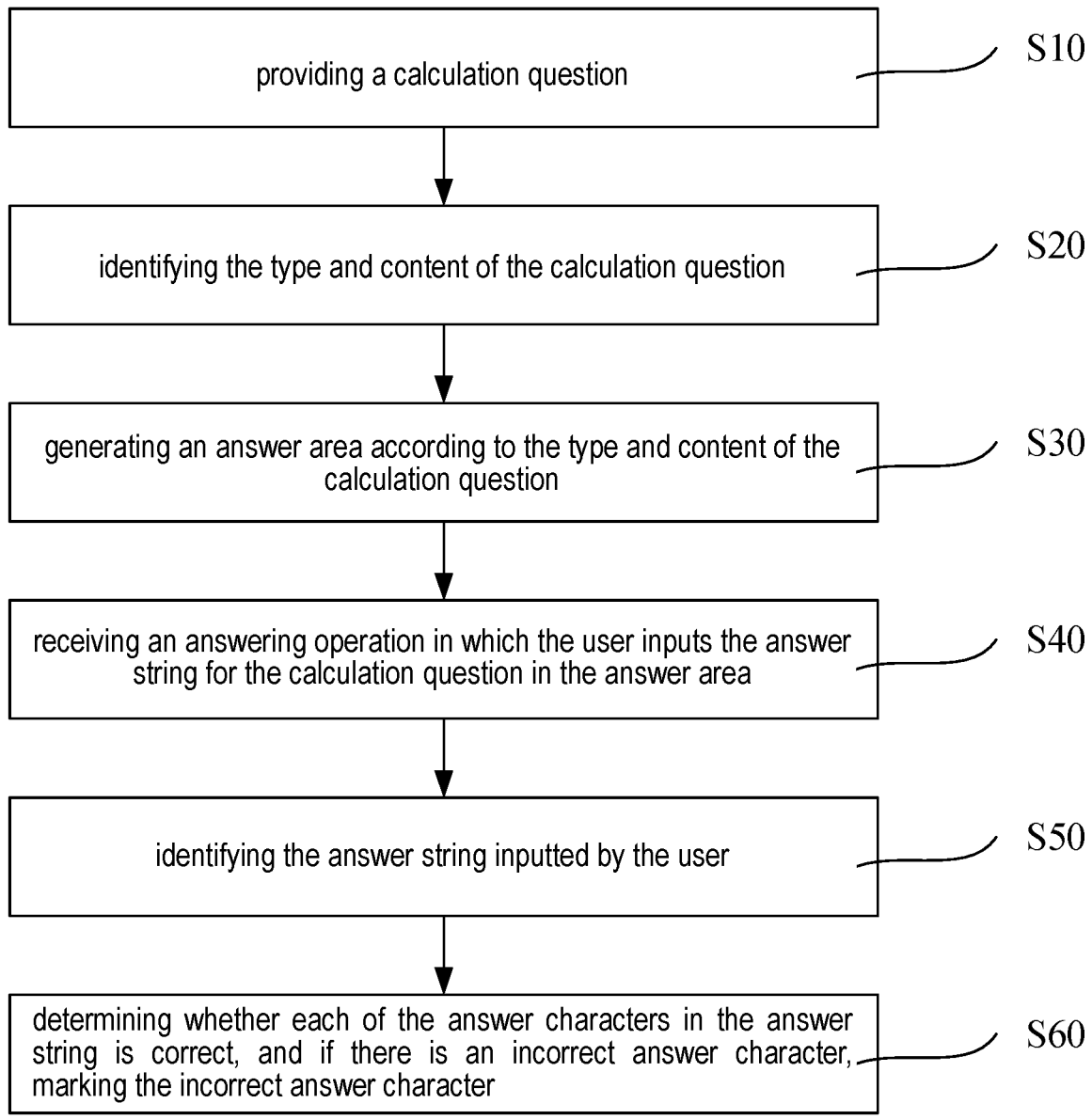
FIG. 1 is a schematic flow chart showing a calculation practicing method according to an embodiment of the present disclosure.

Please refer to FIG. 1, which is a schematic flow chart of a calculation practicing method according to an embodiment of the present disclosure. As shown in FIG. 1, in the embodiment of the present application, the calculation practicing method includes the following steps:

Step S10: providing a calculation question;

Step S20: identifying the type and content of the calculation question;

Step S30: generating an answer area according to the type and content of the calculation question;

Step S40: receiving an answering operation in which the user inputs the answer string for the calculation question in the answer area;

Step S50: identifying the answer string inputted by the user; and

Step S60: determining whether each of the answer characters in the answer string is correct, and if there is an incorrect answer character, marking the incorrect answer character.

Correspondingly, the embodiment of the present disclosure further provides a calculation practicing system. Please refer to FIG. 2, which is a schematic block diagram showing the structure of a calculation practicing system according to an embodiment of the present disclosure.

Figure 2:
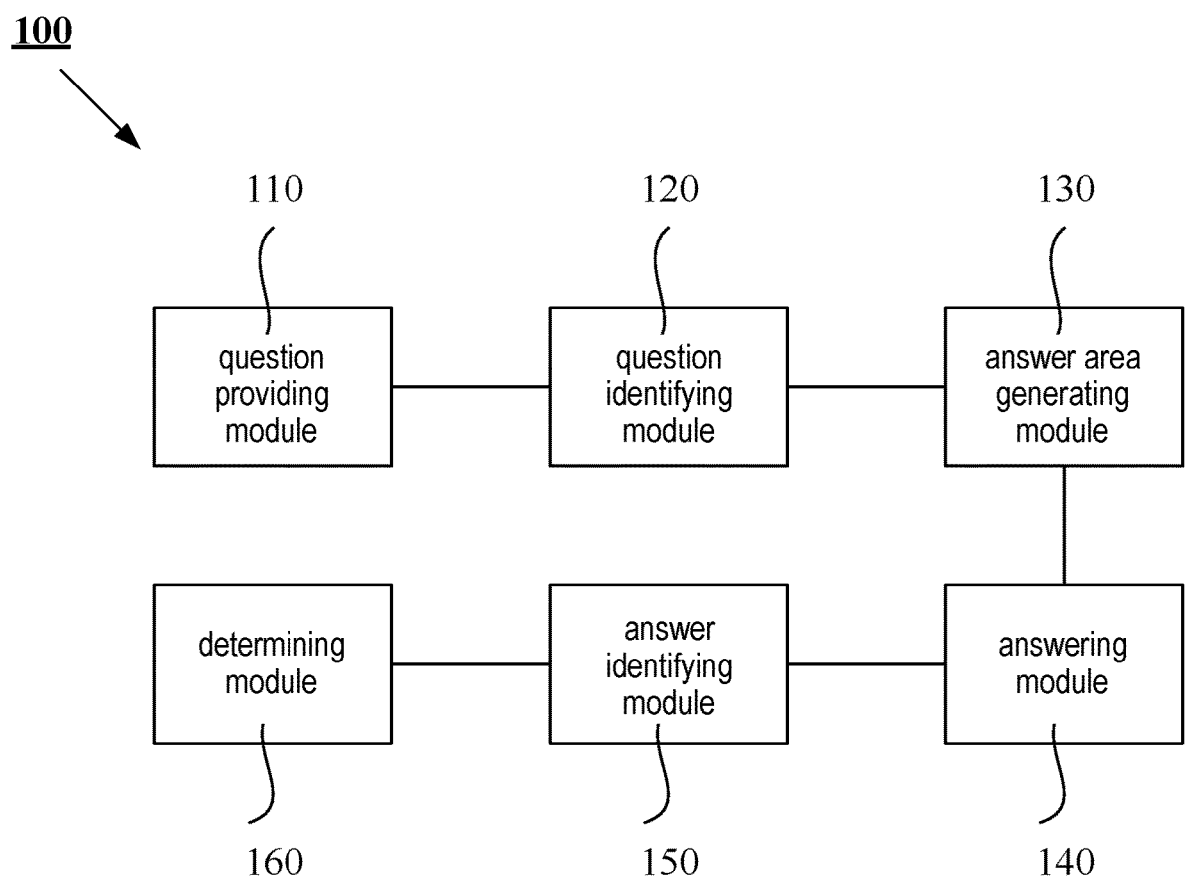
FIG. 2 is a schematic block diagram showing the structure of a calculation practicing system according to an embodiment of the present disclosure.

As shown in FIG. 2, the calculation practicing system 100 includes:

A question providing module 110, wherein the question providing module 110 is configured to provide a calculation question;

A question identifying module 120, wherein the question identifying module 120 is configured to identify the type and content of the calculation question;

An answer area generating module 130, wherein the answer area generating module 130 is configured to generate an answer area according to the type and content of the calculation question;

An answering module 140, wherein the answering module 140 is configured to receive an answering operation in which the user inputs an answer string for the calculation question in the answer area;

An answer identifying module 150, wherein the answer identifying module 150 is configured to identify the answer string inputted by the user; and A determining module 160, wherein the determining module 160 is configured to determine whether each of the answer characters in the answer string is correct, and if there is an incorrect answer character, marking the incorrect answer character.

Here, identifying the type of the calculation question is mainly based on arithmetic or according to operation characters, and includes, for example, an addition operation, a subtraction operation, a multiplication operation, and a division operation, etc.; and identifying the content of the calculation question mainly includes identifying the digits in the calculation question (i.e., identifying the specific number of digits involved in the calculation of the calculation question), including, for example, identifying the number of digits in addend and augend, the number of digits in subtrahend and minuend, the number of digits in multiplier and multiplicand, the number of digits in divisor and dividend. In this manner, in the step of identifying the type and content of the calculation question, it is also possible to obtain the number of answer strings (correct answer strings) that need to be inputted, including obtaining the number of rows of the answer strings (correct answer strings) and the number of answer strings in each row.

In an embodiment of the present application, the answer string mainly includes one or more answer numbers, i.e., Arabic numerals 0, 1, 2, 3, 4, 5, 6, 7, 8, 9; but in some embodiments the answer string may also include one or more answer operators, such as "+", "−", "×", "÷"; or, the answer string includes at least one of the answer numbers and at least one of the answer operators.

In the embodiment of the present application, the question providing module 110 may provide the calculation question by randomly generating a calculation question or provide the calculation question by randomly extracting a calculation question from the question bank. Specifically, the question providing module 110 may include a processing unit, and the processing unit may be configured to implement generating a calculation question randomly. Further, the question providing module 110 may further include a database, wherein the database stores a question bank of the calculation questions, and the processing unit may randomly extract the calculation question from the database to implement providing the calculation question. Alternatively, the processing unit has a networking function, which can randomly extract a calculation question from a remote question bank to implement providing the calculation question. Regarding the specific form of the question providing module 110, the disclosure provides no limitation thereto.

In the embodiment of the present application, the question identifying module 120 identifies the type and content of the calculation question by using a question identifying model. Specifically, the question identifying model is a neural network model established through pre-training with samples. Preferably, the question identifying model extracts feature values based on the deep convolutional neural network CNN, and then generates a final identification result through the attention model identification cycle, and the training process may specifically include the following steps: S1, preparing a certain number of picture samples marked with the type and content as well as position of corresponding calculation questions for the type and content of predetermined calculation questions (questions), the number of picture of the type and content of each calculation question may be equal or different; S2, selecting a certain ratio of picture samples as a test collection from the marked picture samples, wherein the selection may be carried out manually or automatically and randomly. The ratio is generally 5% to 20% of the total number of picture samples. The ratio of the test collection to the total number of picture samples can be adjusted according to the result. The remaining picture samples are a training collection; S3, training the question identifying model by using the training collection, and using the test collection to verify the accuracy of the question identifying model after the training collection is completely trained; S4, if the accuracy rate is larger than or equal to the predetermined accuracy rate, the training ends. If the accuracy rate is smaller than the predetermined accuracy rate, the number picture samples corresponding to the type and content of the predetermined calculation questions is increased, or the ratio of test collection is adjusted for another training. Specifically, the question identifying model may also be another type of neural network model such as ResNet model. In addition, the question identifying model may also be any known specific model for identifying the type and content of the calculation question in the related art.

In the embodiment of the present application, the answer area generating module 130 may generate an answer area beside the calculation question through the identified type and content of the calculation question, and the answer area is configured to receive a step string (i.e., the part of the string forms a step in the calculation question) or a result string (i.e., the part of the string forms a result in the calculation question), the answer string includes at least one of the step string and the result string. Here, the result string mainly includes a result number string (i.e., there may be some other characters, such as an operator), that is, the Arabic numerals 0, 1, 2, 3, 4, 5, 6, 7, 8, 9. Alternatively, the result string includes only the result number; the step string may include a step number string and a step operator string, that is, may include 0, 1, 2, 3, 4, 5, 6, 7, 8, 9, "+", "−", "×", "÷", etc. Specifically, generating an answer area according to the type and content of the calculation question includes: generating a certain number of character filling cells according to the type and content of the calculation question, wherein the answer area includes the certain number of character filling cells, the number of character filling cells is determined according to the type and content of the calculation question, and here, that is, the number of character filling cells matches the number of characters in the answer string (correct answer string) that needs to be inputted. In the embodiment of the present application, the number of character filling cells is the same as the number of characters of the answer string (the correct answer string) that needs to be inputted. According to the type and content of the calculation question, the specific digital content of the answer can be obtained through the calculation module, thereby determining the number of character filling cells in the answer area.

Specifically, for example, if it is identified that the type and content of the calculation question are a single digit addition, the answer area may be directly formed beside the calculation question (usually on the right side) as an input area of the result string; further, a corresponding number of character filling cells may be formed according to the number of digits of the result string, for example, if the result string is a single digit, one character filling cell is formed (the character filling cell serves as an answer area or in the answer area). Moreover, if the result string is a two-digit number, a two-character filling cell is formed. In another example, if it is identified that the type and content of the calculation question are as single digit multiplication, the answer area may be directly formed beside the calculation question (usually on the right side) as an input area of the result string. Here, considering that the addition, subtraction, multiplication, and division of single digits are relatively simple, the answer area can be directly formed beside the calculation question (usually on the right side) as the input area of the result string.

In addition, in the embodiment of the present application, when there is a more complicated type of calculation question, the answer area can also be generated only beside the calculation question. On this occasion, the answer area may include multiple parts, for example, including a first part of the answer area on the right side of the calculation question, and the first part of the answer area is configured for inputting a result string (which may be only a result number), and a second part of the answer area on the lower side of the calculation question, the second part of the answer area is configured for inputting a step string (which may include each specific step, and may correspondingly involve a step number string and a step operator string) and a result string (which can only be the result number).

Specifically, the first part of the answer area may include a result row, which may be one row of first character filling cells, and the number of cells of one row of the first character filling cells is determined according to the type and content of the calculation question. Here, the number of cells in one row of the first character filling cells matches the number of characters of the result string (the correct result string) that needs to be inputted. The second part of the answer area includes m rows of the second character filling cells, and the m rows of second character filling cells include one row of character filling cells for receiving the result string and (m−1) rows of character filling cells for receiving the step string, wherein m is a natural number and is determined according to the type and content of the calculation question, and mainly includes one result row or one result row and at least two step rows. The number of cells in the m rows of second character filling cells is determined according to the type and content of the calculation question. Here, the specific value of m matches the number of rows of the step string and the result string that need to be inputted, and the number of cells of each row of the second character filling cells matches the number of characters in each row of step string or each row of result string. Specifically, the specific value of m and the number of cells of each row of the second character filling cells can be obtained through corresponding determining of the identified type and content of the calculation question.

For example, if it is identified that the type and content of the calculation question is a two-digit multiplication, the first part of answer area may be formed on the right side of the calculation question as an input area of the result string, that is, a result row is generated, and the second part of answer area is formed on the lower side of the calculation question as the input area of the step string and the result string, which means that the result row and the step row are generated. Specifically, the vertical calculation formula and (the step string and result string) in each corresponding calculation step can be inputted in the second part of answer area. Here, the content of the second part of answer area may include a step number string, a step operator string, and a result number string. In one embodiment of the present application, the vertical calculation formula can be inputted by the user, that is, as a part of the answer string, and correspondingly, one row in the vertical calculation formula takes up one step row. In another embodiment of the present application, the vertical calculation formula may be generated after determining the type and content of the calculation question, that is, the form of the vertical calculation formula, the number of step rows, and the number of character filling cells in each step row that needs to be generated is determined according to the type and content of the calculation question as well as the basic principle of mathematical calculation. Such method will be further explained in the following examples.

For example, if it is identified that the type and content of the calculation question are two-digit multiplication, the vertical calculation formula may be generated on the lower side of the calculation question, and one row of first character filling cells may be generated on the right side of the calculation question, that is, one result row (in other embodiments of the present application, the result row may not be generated on the right side of the calculation question), and three rows of second character filling cells are generated on the lower side of the vertical calculation formula, which are one result row and two step rows (the number of step rows is determined according to the type and content of the calculation question. In this embodiment, the two-digit multiplication has two step rows according to the basic principle of mathematical calculation). Specifically, one row of first character filling cells may include three or four characters filling cells (the number of character filling cells in each step row and result row is determined according to the type and content of the calculation question. In this embodiment, in the step row of the two-digit multiplication, a corresponding number of character filling cells is generated according to the calculation result obtained by multiplying each number of the multiplicand with the multiplier, and in the result row, a corresponding number of character filling cells is generated according to the final calculation result. Other types or forms of the calculation questions also generate the corresponding vertical calculation formula and character filling cells according to the similar principle). For example, according to the identified type of the calculation question, one row of first character filling cells including four character filling cells is obtained, three rows of second character filling cells respectively include three character filling cells, three character filling cells and four character filling cells. Here, the type and content of the calculation question may include the arithmetic (or arithmetic symbol) of the calculation question, the number of arithmetic digits involved in the calculation of the calculation question, and even include the arithmetic value involved in the calculation of the calculation question. In this manner, in the process of identifying the calculation question, it is easy to determine the number of rows of the corresponding character filling cells and the number of cells per row.

In the embodiment of the present application, the answering module 140 can be implemented by using a touch display, that is, the touch display is used to implement receiving the answering operation in which the user inputs the answer string for the calculation question in the answer area. Further, the answering module 120 can also be implemented through a touch display and a stylus, or through coordination of a display and a keyboard, etc. Specifically, the touch display can be used as an input device to receive an answering operation in which the user inputs the answer string for the calculation question, or serve as an output device that displays the calculation question, the final determining result and so on.

Further, the answer identifying module 150 may be implemented through the foregoing processor or another processor, that is, the processor is used to implement identifying the answer string inputted by the user in the answer area. Specifically, the answer string inputted by the user may be a print font or a handwritten font. Correspondingly, the answer string inputted by the user is presented in two ways, either presented in a handwritten font or a print font. In addition, in the case that the answer string inputted by the user is a handwritten font, the handwritten font can also be automatically converted into a print font for presentation. In the embodiment of the present application, if the answer string is a handwritten font, the identification of the answer string may be completed by using a common screen handwritten character identifying method, which is, for example, similar to the handwriting function of common input methods. If the answer string is a print font, which is, for example, inputted by keyboard, the keyboard input number can be directly obtained.

In the embodiment of the present application, the question determining module 160 may be implemented through the foregoing processor or another processor, that is, the processor is configured to implement determining whether each of the answer characters in the answer string is correct, if there is an incorrect answer character, then the incorrect answer character is marked.

Figure 3:
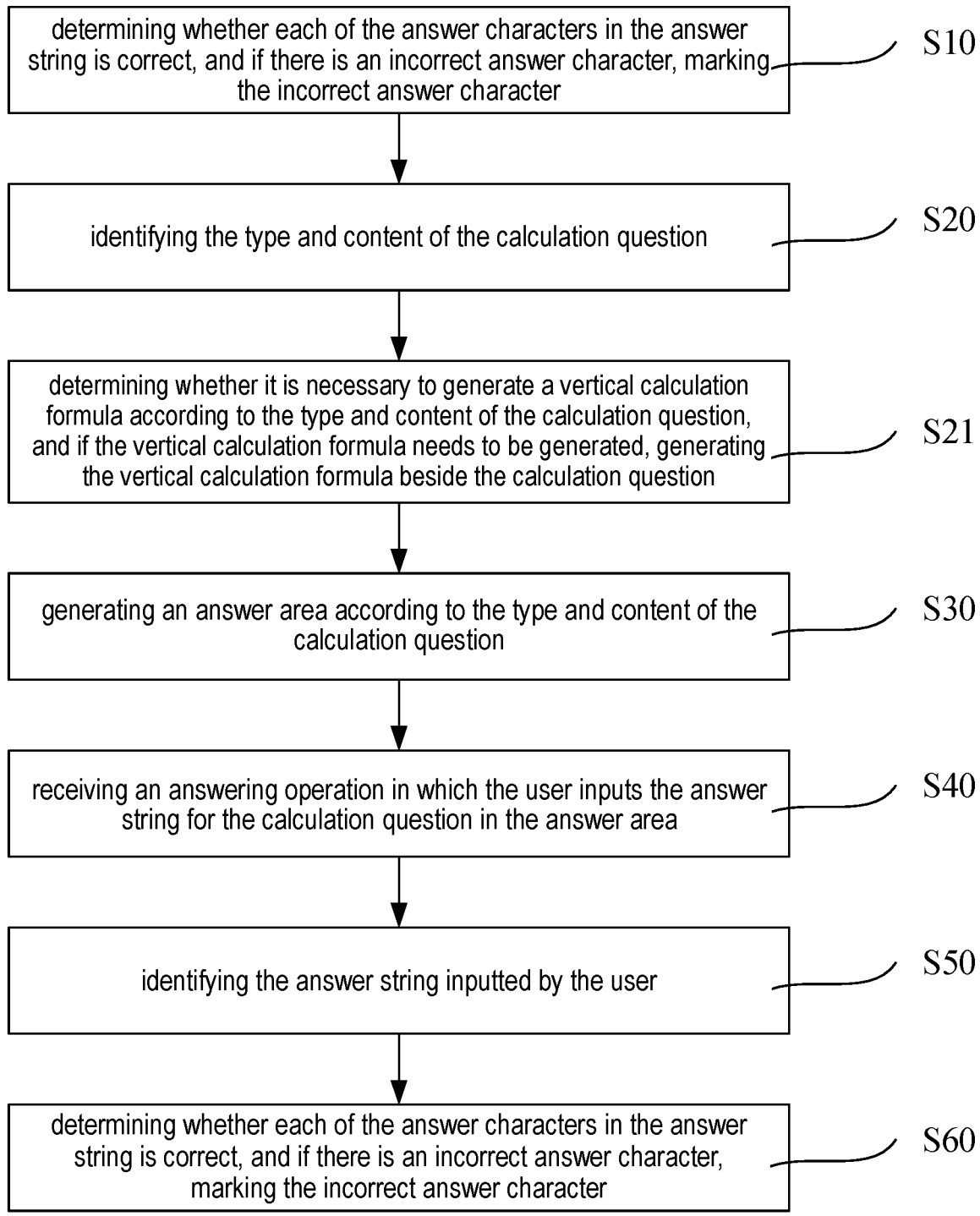
FIG. 3 is a schematic flow chart of a calculation practicing method according to another embodiment of the present disclosure.

Further, referring to FIG. 3, in the embodiment of the present application, after identifying the type and content of the calculation question, preferably, before the answer area is generated according to the type of the calculation question, the calculation practicing method may further include the following steps:

Step S21: determining whether it is necessary to generate a vertical calculation formula according to the type and content of the calculation question, and if a vertical calculation formula needs to be generated, generating a vertical calculation formula beside the calculation question.

That is, as shown in FIG. 3, in an embodiment of the present application, the calculation practicing method may specifically include the following steps:

Step S10: providing a calculation question;

Step S20: identifying the type and content of the calculation question;

Step S21: determining whether it is necessary to generate a vertical calculation formula according to the type and content of the calculation question, and if the vertical calculation formula needs to be generated, generating the vertical calculation formula beside the calculation question (if the determining result is that the vertical calculation formula needs not be generated, then no vertical calculation formula is generated);

Step S30: generating an answer area according to the type and content of the calculation question;

Step S40: receiving an answering operation in which the user inputs the answer string for the calculation question in the answer area;

Step S50: identifying the answer string inputted by the user; and

Step S60: determining whether each of the answer characters in the answer string is correct, and if there is an incorrect answer character, marking the incorrect answer character.

Figure 4:
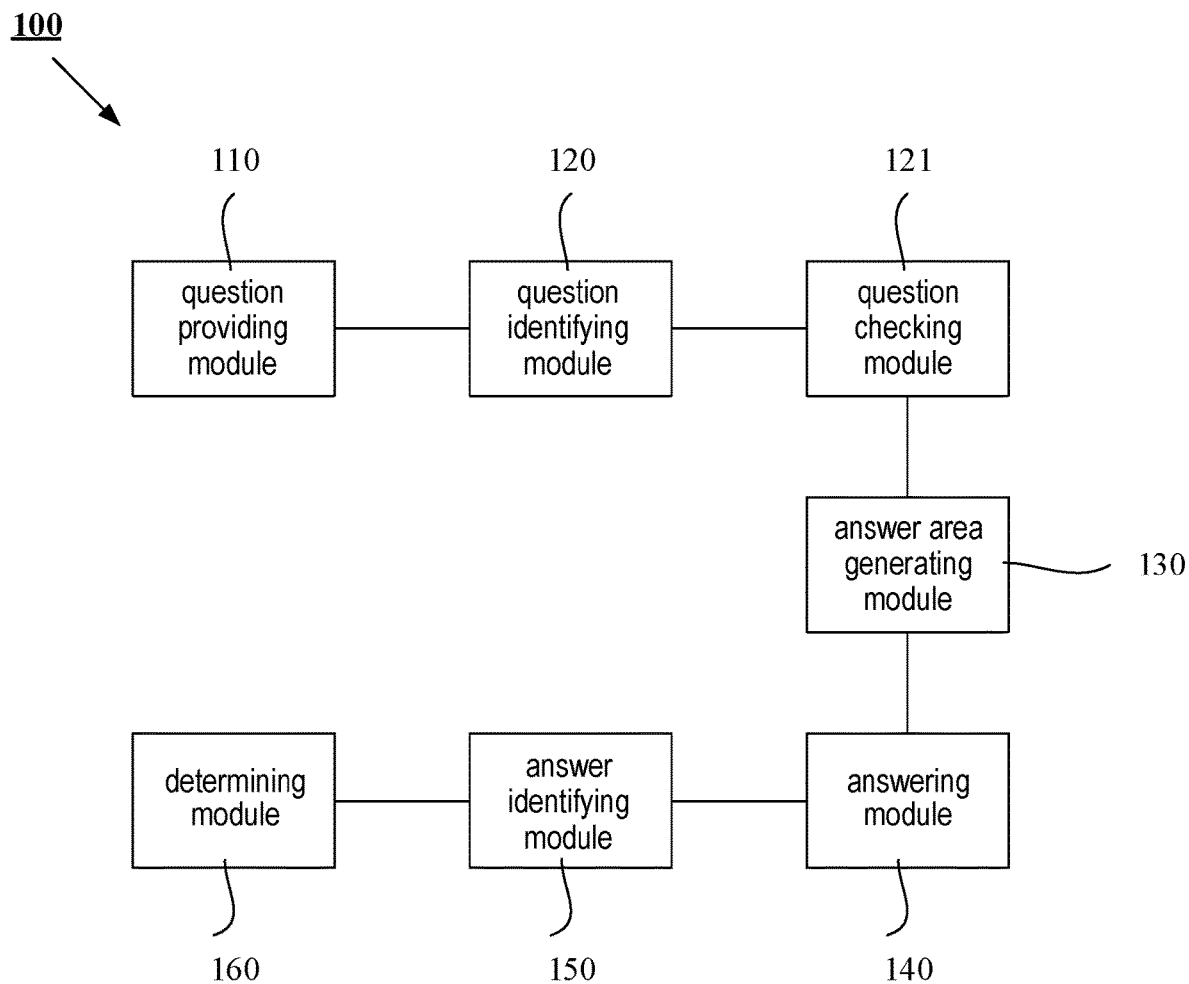
FIG. 4 is a schematic block diagram showing the structure of a calculation practicing system according to another embodiment of the present disclosure.

Correspondingly, as shown in FIG. 4, the calculation practicing system 100 further includes a question checking module 121, and the question checking module 121 is configured to determine whether a vertical calculation formula needs to be generated according to the type and content of the calculation question, if it is necessary to generate a vertical calculation formula, then generating the vertical calculation formula beside the calculation question.

Preferably, when it is identified that the type and content of the calculation question are complicated, for example, at least one figure in the calculation question includes a number of two digits or more, for example, the subtrahend and the minuend are both two digits, the multiplier is a two-digit number and the multiplicand is a one-digit number, the addend is a three-digit number and the augend is a two-digit number and so on, then a vertical calculation formula is generated below (on the lower side of) the calculation question. In the embodiment of the present application, when it is identified that the type and content of the calculation question are simple calculation questions, here, mainly including the addition, subtraction, multiplication, and division operations of single-digit numbers, then no vertical calculation formula is generated below (on the lower side of) of calculation question.

In an embodiment of the present application, in the case of generating the vertical calculation formula, when generating an answer area, a plurality parts of the answer area may be generated. For example, the answer area may include a first part of answer area beside the calculation question and a second part of answer area beside the vertical calculation formula, wherein the first part of answer area may be located on the right side of the calculation question, and the second part of answer area may be located on the lower side or the upper side of the vertical calculation formula (mainly in the division vertical calculation formula). In other embodiments of the present application, the answer area may be generated only beside the vertical calculation formula.

Further, the answer area includes at least one row of character filling cells. Herein, the first part of answer area includes at least one row of character filling cells, which is the result row, and the second part of answer area also includes at least one row of character filling cells, which includes one result row or includes one result row and at least two step rows. Specifically, each row of character filling cells is configured for filling in step string (i.e., a step row, which mainly includes a step number string) or a result string (i.e., a result row, which mainly includes a result number string), the answer string includes at least one of the step string and the result string. Correspondingly, the answer area generating module 130 is further configured to generate the character filling cells.

For example, a calculation question provided is a two-digit addition operation (the addend and the augend are both two digits), and a vertical calculation formula is generated correspondingly, and one row of character filling cells (i.e., the result row, in other embodiments of the present application, which may not be generated) beside the calculation question, and one row of character filling cells (which is also a result row) is generated below the vertical calculation formula. The one-row character filling cells below the vertical calculation formula is configured for filling in the result string. The one-row character filling cells may include two character filling cells, or may include three character filling cells, which is determined according to the specific calculation question. That is, the corresponding number of character filling cells is generated according to the basic principle of two-digit addition as well as the specific value of the addend and the augend. The one-row character filling cells and the vertical calculation formula can be separated by a horizontal line.

In another example, a calculation question provided is a two-digit multiplication operation (the multiplier and the multiplicand are both two digits), and a vertical calculation formula is generated correspondingly. Meanwhile, one row of character filling cells (i.e., result row, which may not be generated in other embodiments of the present application) is generated beside the calculation question, and three rows of character filling cells (which includes one result row and two step rows) are generated below the vertical calculation formula. Specifically, the first two rows of character filling cells are configured for filling in the step string, and the third row of character filling cells is configured for filling in the result string. The first two rows of character filling cells can be separated from the vertical calculation formula by horizontal lines. The third row of character filling cells and the first two rows of character filling cells can also be separated by horizontal lines. Specifically, each row of character filling cells in the first two rows of character filling cells may include two-character filling cells or may also include three-character filling cells. The third row of character filling cells may include three-character filling cells or may also include four-character filling cells, and the number of character filling cells is determined according to the specific calculation question. Specifically, the number of step rows is determined according to the type and content of the calculation question. In this embodiment, the two-digit multiplication has two step rows according to the basic principle of mathematical calculation, and the number of character filling cells in each step row and result row is determined according to the type and content of the calculation question. In the present embodiment, in the step row of the two-digit multiplication calculation, a corresponding number of character filling cells is generated according to the calculation result obtained by multiplying each number in the multiplicand by the multiplier; for the result row, a corresponding number of character filling cells is generated according to the final calculation result.

Specifically, each character filling cell may be presented in the form of a box, or may be presented in the form of a horizontal line, or may be in the form of a background color (for example, only the character filling cells are shown with yellow background color, and other positions (e.g., where the calculation question is shown) are shown with white background color) and so forth, the present application provides no limitation thereto, it will suffice as long as it can be shown that this is one or here is one row of character filling cells.

Figure 6:
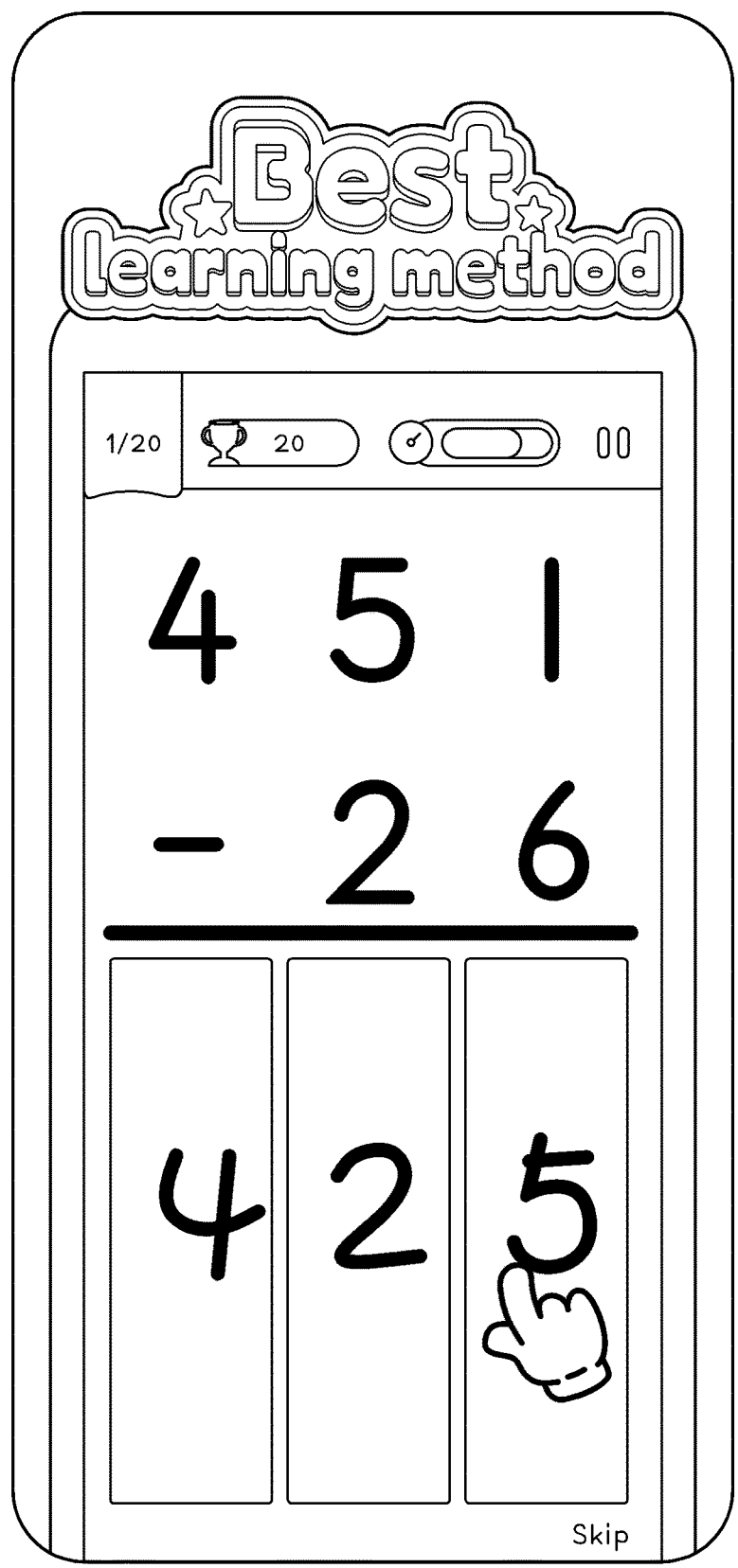
FIG. 6 is a schematic diagram showing an example of a vertical calculation formula according to an embodiment of the present disclosure.

For example, as shown in FIG. 6, it shows a vertical calculation formula and a correspondingly provided character filling cells. Here, only the calculation question calculated through the vertical calculation formula is provided, and the provided vertical calculation formula is a subtraction calculation in which the subtrahend is a three-digit number and the minuend is a two-digit number. Based on the basic principle of subtraction calculation and the specific values of the subtrahend and the minuend, one result row including three-character filling cells is provided, and each character filling cell is presented in the form of a box. The user can fill in the corresponding characters in each character filling cell as the answer.

Preferably, if there is an incorrect answer character, the incorrect answer character is marked (i.e., marked as an error by showing, for example, a cross or highlighting in red color and so on) and the correct answer character can be also shown simultaneously, so that the user can easily see the problem in the calculation question, thereby achieving the best result of calculation practices. In the embodiment of the present application, when the correct character answer is displayed, it can be displayed beside the corresponding character filling cells, so that it can be seen more easily. Here, the determining module 160 determines whether each answer character in the answer string is correct. If there is an incorrect answer character, the incorrect answer character is marked and the correct answer character is displayed beside the corresponding character filling cells simultaneously. In other embodiments, the correct answer character can be shown later, the present application provides no limitation thereto.

In the embodiment of the present application, the determining module 160 may determine whether each answer character inputted by the user is correct according to the known answer (e.g., when the calculation question is provided, the determining module 160 obtains the answer to the calculation question simultaneously). Alternatively, the determining module 160 can also obtain the answer by calculating the provided calculation question, and determine whether each answer character inputted by the user is correct according to the calculated answer.

In the embodiment of the present application, the determining module 160 determines whether each answer character is correct. For example, the answer string includes four answer characters, and the determining module 160 determines whether each of the four answer characters is correct, and a mark is shown beside the incorrect answer character. Specifically, when the determining module 160 determines whether each of the four answer characters is correct, the judgment may be made according to the order from left to right (i.e., thousands digits to units digits), or may be made according to the order from right to left (i.e., units digits to thousands digits). In the meantime, comparison and judgment may be simultaneously made on the four-digit answer, the present application provides no limitation thereto.

Figure 5:
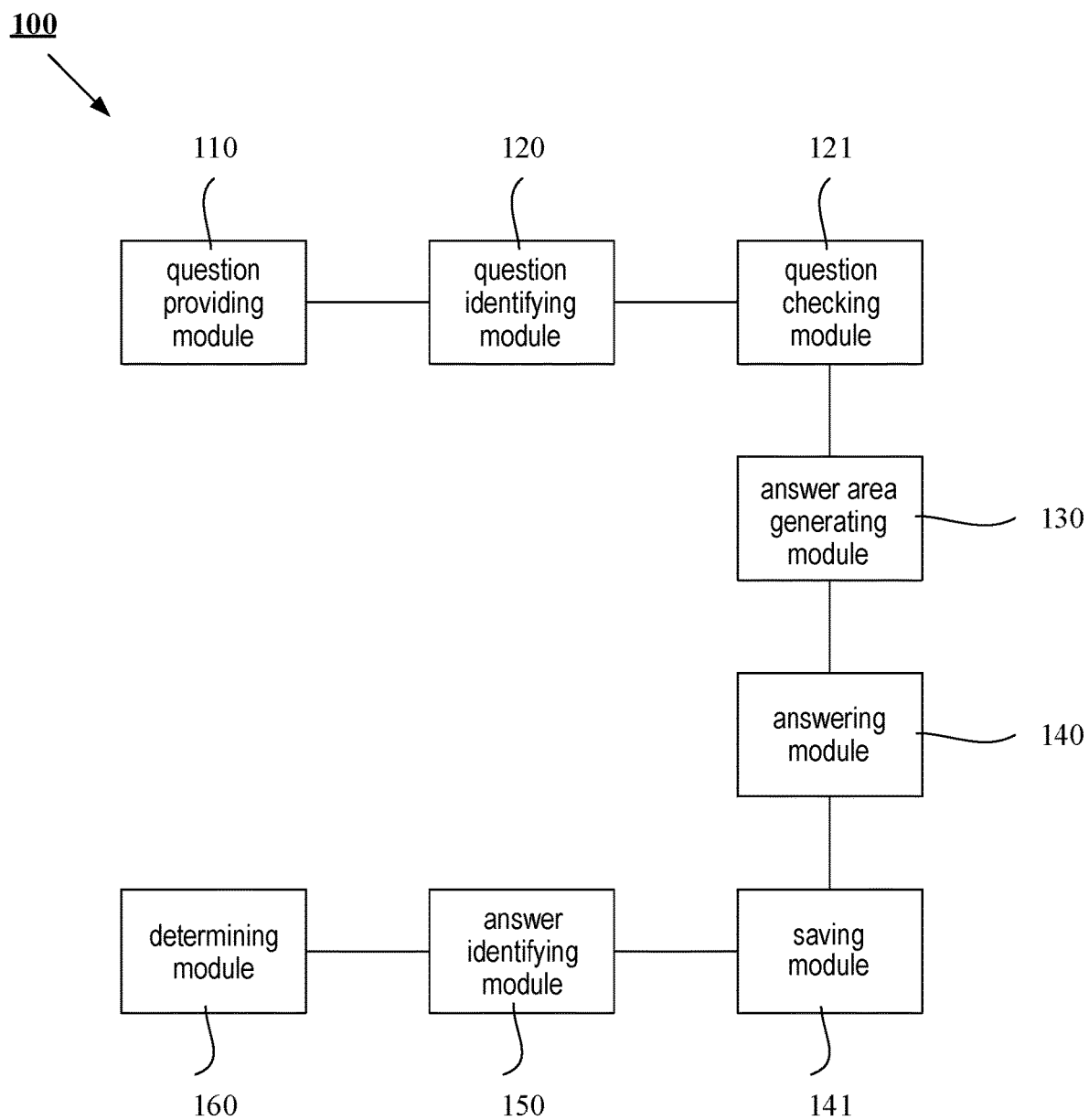
FIG. 5 is a schematic block diagram showing the structure of a calculation practicing system according to another embodiment of the present disclosure.

In the embodiment of the present application, after receiving the answering operation in which the user inputs the answer string for the calculation question in the answer are, the calculation practicing method may further include: take a screenshot to save the answering operation interface where the user inputs the answer string for the calculation question in the answer area. Correspondingly, the calculation practicing system 100 further includes: a saving module 141 (shown in FIG. 5), wherein the saving module 141 is configured to take a screenshot to save the answering operation interface where the user inputs the answer string for the calculation question in the answer area. Further, in the step of identifying the answer string inputted by the user, the answer identifying module 150 identifies the answer string on the operation interface saved by the screenshot. In this manner, the user can continuously answer the question and obtain the result of whether the inputted answer string is correct or not after completing a certain number of calculation questions. Specifically, the screenshot operation may be implemented by the foregoing processor or another processor, and the screenshot may be saved through a memory.

In the embodiment of the present application, the answer string inputted by the user may be a print font or a handwritten font. Meanwhile, when the answer identifying module 150 identifies the answer string on the operation interface saved by the screenshot, the first character identifying model may be used to identify the print font, and the second character identifying model is used to identify the handwritten font. Specifically, the first character identifying model and the second character identifying model may be obtained through training a neural network model, that is, the first character identifying model and the second character identifying model may be neural network models that are established respectively through pre-training with samples, or any specific existing model for character identification in related art may be adopted.

Specifically, in the step of providing a calculation question, a certain number of calculation questions are provided, and before the answer string inputted by the user is identified, receiving the answering operation in which the user inputs the answer string for the calculation question in the answer area and taking the screenshot to save the answering operation interface in which the user inputs the answer string for the calculation question in the answer area are performed cyclically until all the calculation questions provided are completed. Under the circumstances, the multiple calculation questions may be simultaneously displayed and provided to the user. When the multiple calculation questions are simultaneously displayed, they may be displayed on one page (on the display screen) or on multiple pages (on the same display screen).

Alternatively, before the answer string inputted by the user is identified, providing the calculation questions, receiving the answering operation in which the user inputs the answer string for the calculation question in the answer area and taking the screenshot to save the answering operation interface in which the user inputs the answer string for the calculation question in the answer area are performed cyclically until a certain number of the calculation questions are completed. On this occasion, a certain number of calculation questions can be separately displayed and provided to the user, that is, after the user completes the operation of inputting the answer string for one calculation question, another calculation question is then displayed.

In the embodiment of the present application, when the calculation question is provided, the number of calculation questions that need to be completed is simultaneously provided, that is, the foregoing specific value of the certain number of questions is displayed, for example, 10 (questions), 20 (questions), and the like. Further, each time a calculation question is provided, an interrupt operation may also be provided simultaneously (the interrupt operation may occur simultaneously with the calculation question in the form of a "finish" button), so that the user can autonomously decide the number of calculation questions to be completed.

Preferably, when receiving the answering operation in which the user inputs the answer string for the calculation question in the answer area, the time for the user to complete the operation is simultaneously provided. In this manner, it is easy for the user to understand the speed of answering the question, thereby further understanding the situation and effect of the calculation practice. Or, in the operation of receiving the answer string for the calculation question inputted by the user in the answer area, the time taken by the user to perform the operation is limited. In this manner, it is possible to help the user to concentrate and complete calculation practices more efficiently, thereby enhancing the user's calculating speed and ability.

Figure 7:
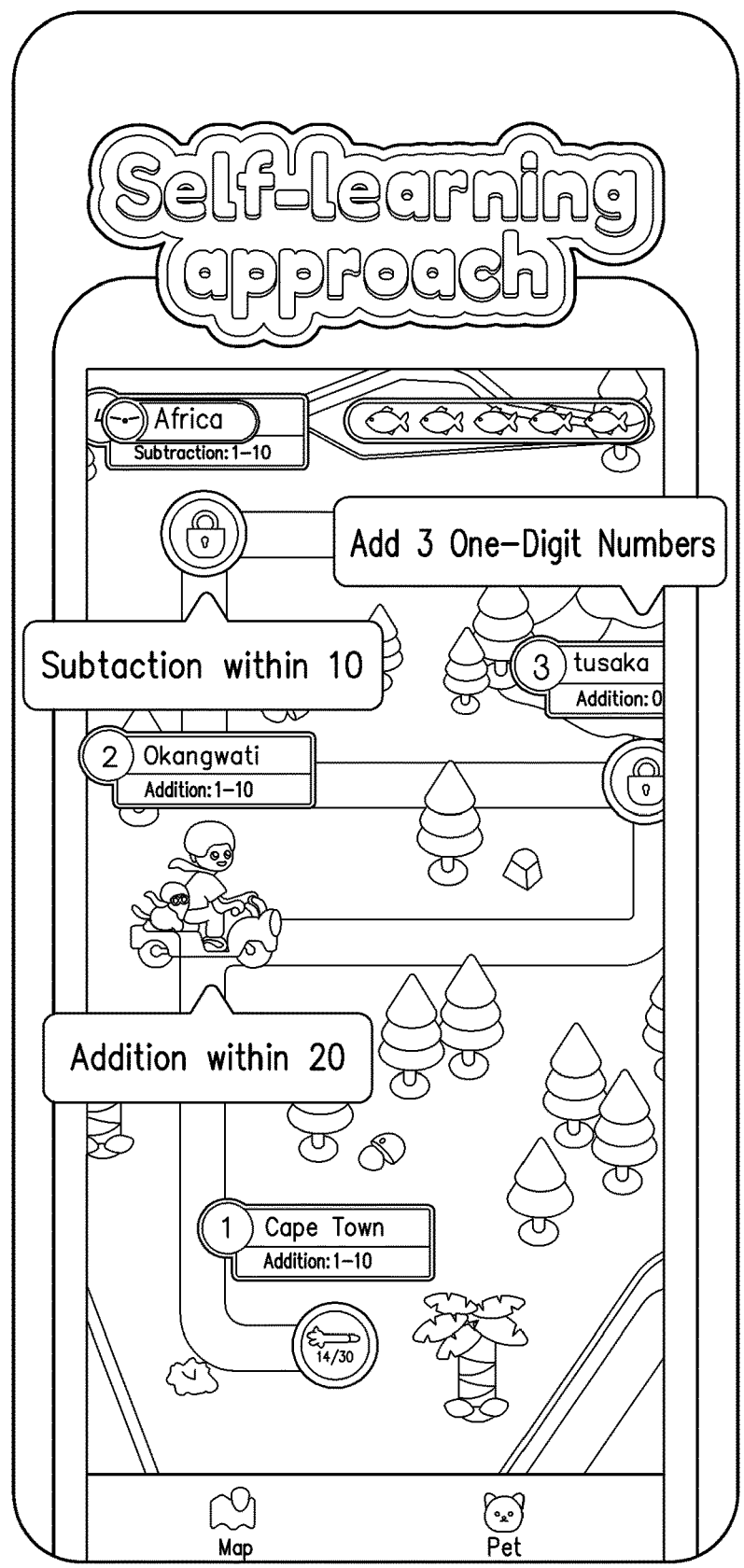
FIG. 7 is a schematic diagram showing an example of an upgrade path according to an embodiment of the present disclosure.

Further, before the calculation question is provided, the calculation practicing method further includes: providing a calculation question upgrade path, wherein the calculation question upgrade path includes a plurality of levels. Specifically, in the step of providing the calculation question, the provided calculation question is the calculation question in the current level. The multiple levels can be arranged/connected in sequence to form a calculation practice map/path. Preferably, the plurality of calculation question levels in the calculation question upgrade path are arranged according to the simple and complex relationships of the calculation questions. For example, as shown in FIG. 7, a map-like interface may be provided, and there is a path on the interface, and different sites along the path represent different levels, and each time a level is passed, the user can reach the next level by moving forward a distance along the path.

In the embodiment of the present application, in the calculation question upgrade path, the first level has been opened, and the opening of the next level requires the completion of the previous level. Specifically, obtaining qualification and completion of a level can be achieved by setting the score or the answer accuracy rate. For example, in answering questions of a level, when the set score the set accuracy rate is reached, it is considered that the level is completed and qualification is obtained. Preferably, when the calculation question is provided, the answer score of the current level is also provided, thereby also facilitating the user to understand his/her own practicing status.

Further, in the current level, if the number of the incorrect answer reaches a certain number, the number of calculation questions of the current level is automatically increased. For example, if the number of questions for each level is 20, it can be set that when the number of incorrect answer reaches 8, the number of questions for the current level will be automatically increased by 10.

In the embodiment of the present application, before providing the calculation question, the user can select the level of the questions, and if the answer error reaches a certain number in the selected level, the user is automatically brought to the current level. The selection of the levels (path jumping) is mainly suitable for the user or the system that considers that some types of questions have been already mastered. When it is necessary to select a level that suits the user's ability, the user can adjust the level to challenge some questions to see if the level is suitable for the user. If the selected level is suitable for the user (i.e., in the selected level, the number of the answer error is less than the predetermined number), the user can proceed practicing in the selected level. If the selected level is not suitable for the user (i.e., in the selected level, the number of the answer error reaches a certain number), the user returns to the current level. In this manner, for different users with different abilities and making different progresses, they can well adjust themselves to the method. If in the current level, the number of the answer error reaches a certain number, the user need to redo this level, and the questions can be the same or different.

In the embodiment of the present application, an electronic device and a computer readable storage medium are also provided. The electronic device includes a processor, a memory, and a display; the memory is configured to store a computer program; the processor is configured to execute the computer program to implement the method as described above; and the display is configured to display the result of the executed computer program. The computer readable storage medium stores a computer program, and the computer program is executed by the processor to implement the method as described above.

Next, several specific examples will be incorporated to further describe the technical solution of the present disclosure.

Example 1

Figures 8, 9:
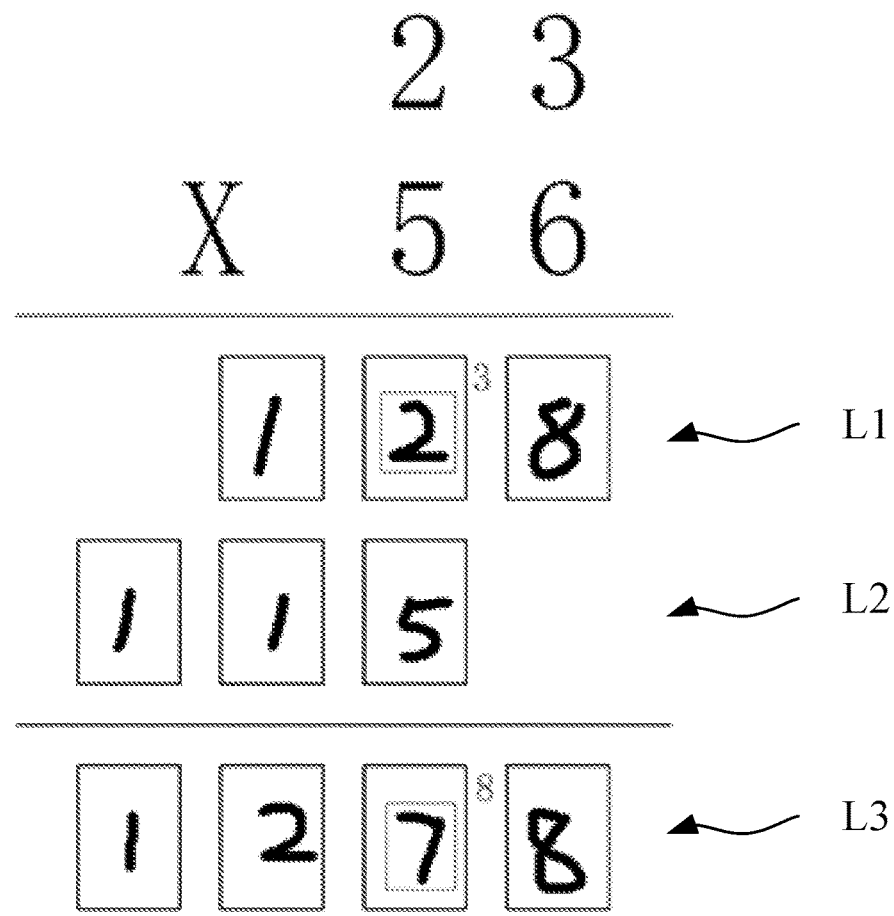
FIG. 8 is a schematic diagram of a calculation question according to an embodiment of the present disclosure.
FIG. 9 is a schematic diagram of a calculation question according to another embodiment of the present disclosure.

As shown in FIG. 8, a calculation question: 23×56 is provided. After the type and content of the calculation question are identified, the calculation question: a vertical calculation formula of 23×56 is generated below the calculation question. In this embodiment, three rows of character filling cells are generated on the lower side of the vertical calculation formula, which are the first row of character filling cells L1 (here as a step row), the second row of character filling cells L2 (here as a step row) and the third row of character filling cells L3 (here as a result row), respectively. Specifically, the first row of character filling cells L1 includes three-character filling cells, the second row of character filling cells L2 includes three-character filling cells, the third row of character filling cells L3 includes four-character filling cells. Here, each character filling cell is presented in the form of a box.

The user can input the answer character in the three-character filling cells. Here, the user inputs three answer characters 1, 2, and 8 in the first row of character filling cells L1, inputs three answer characters 1, 1, and 5 in the second row of character filling cells L2, and inputs four answer characters 1, 2, 7 and 8 in the third row of character filling cells L3 through handwritten font.

After the answer string inputted by the user is identified, the accuracy of each answer character in the answer string is determined according to the form of the vertical calculation and the wrong answer character is marked. In the answer string shown in FIG. 8, there are two answer characters with errors, which are respectively the character 2 in the middle character filling cell of the first row of character filling cells L1 and the character 7 in the second character filling cell from the right of the third row of character filling cells L3. Here, the two wrong answer characters are marked by a box (which may be referred to as small box in order to distinguish it from the box of the character filling cells), and further, the correct answer characters are displayed beside (in the upper right corner of) the (big) box of the character filling cells, and the displayed characters are 3 and 8. In this manner, the user can easily see the errors, thereby saving the user's time.

Example 2

As shown in FIG. 9, a calculation question: 351+468 is provided. After the type and content of the calculation question are identified, the calculation question: a vertical calculation formula of 351+468 is generated below the calculation question. In this embodiment, one row of character filling cells is generated on the lower side of the vertical calculation formula, which is the character filling cells L4, and the character filling cells L4 include three-character filling cells. Here, each character filling cell is presented in the form of horizontal line.

The user can input an answer string in the row of character filling cells L4. Here, the user inputs three answer characters 8, 1 and 9 in the row of character filling cells L4 through print font. Specifically, the input of print font can be implemented through operating tools such as a keyboard.

After the answer string inputted by the user is identified, the accuracy of each answer character is determined according to the form of the vertical calculation. Here, the three answer characters are all correct, and thus there is no wrong answer character to be marked. In the embodiment of the present application, the answer string with all correct answer characters is not marked, in other embodiments of the present application, the answer string with all correct answer characters (i.e., all answer characters inputted for a calculation question are correct) may also be marked, for example, in the form of a check, thereby clearly showing that the answer string for the calculation question is subjected to review (subjected to judgment), and the result is all correct, and the user can easily see the result.

Example 3

As shown in FIG. 10, a calculation question: 47-16 is provided. After the type and content of the calculation question are identified, the calculation question: the vertical calculation formula of 47-16 is generated below the calculation question. In this embodiment, one row of character filling cells is generated on the lower side of the vertical calculation formula, which is the character filling cells (row) L5, and the one row of character filling cells L5 includes two-character filling cells. Here, each character filling cell is presented in the form of a box.

The user can input the answer string in the row of character filling cells L5, wherein the user inputs two answer characters 2 and 1 in the row of character filling cells L5 through handwritten font. Specifically, the input of handwritten font may be implemented through the user's finger input or operating tools such as a stylus.

After the answer string inputted by the user is identified, the accuracy of each answer character is determined according to the form of the vertical calculation and the wrong answer character is marked. In the answer string shown in FIG. 10, there is an error in the answer character, that is, the character 2 in the left character filling cell of the row of character filling cells L5 is incorrect. Here, the wrong answer character is marked in the form of a slash (filled in a character filling cell with the wrong character), and further, the correct answer character, i.e., character 3, is displayed in the lower right corner of the character filling cell with the incorrect character. In this manner, the user can easily see the error, thereby saving the user's time.

Example 4

As shown in FIG. 11, a calculation question: 3404÷54 is provided. After the type and content of the calculation question are identified, the calculation question: the vertical calculation formula of 3404÷54 is generated below the calculation question. In this embodiment, four rows of character filling cells are generated on the lower side of the vertical calculation formula, and one row of character filling cells is generated on the upper side of the calculation question in the form of vertical calculation, respectively, which are character filling cells (row) L6, character filling cells (row) L7, character filling cells (row) L8, character filling cells (row) L9 and character filling cells (row) L10, respectively. Specifically, the character filling cells (row) L6 include three-character filling cells, the character filling cells (row) L7 include three-character filling cells, the character filling cells (row) L8 include three-character filling cells, the character filling cells (row) L9 include one-character filling cell, and the character filling cells (row) L10 include two-character filling cells. Here, each character filling cell is presented in the form of a box.

The user can input the answer string in the five rows of character filling cells, wherein the user inputs three answer characters 3, 2 and 4 in the character filling cells (row) L6, inputs three answer characters 1, 6 and 4 in the character filling cells (row) L7, inputs three answer characters 1, 6 and 2 in the character filling cells (row) L8, inputs one answer character 2 in the character filling cells (row) L9, and inputs two answer characters 6 and 3 in the character filling cells (row) L10 through print font.

After the answer string inputted by the user is identified, the accuracy of each answer character is determined according to the form of the vertical calculation. Here, all the twelve answer characters are correct, that is, the answer string for the calculation question is correct. In the embodiment of the present application, a check is made beside the calculation question to indicate that all twelve answer characters are correct, so that the user can easily see the result. In other embodiments of the present application, graphics or sentences indicating correctness and encouragement may be further displayed, for example, pentagrams, "perfect", etc. may be shown on (or beside) the calculation question and the answer string thereof.

Example 5

As shown in FIG. 12, a calculation question: 3+8 is provided. After the type and content of the calculation question are identified, an answer area is generated on the right side of the calculation question, wherein the answer area includes two-character filling cells which are presented as boxes. The user can input an answer string in the two-character filling cells in the answer area, wherein the user inputs the answer string (which also refers to the answer number string) 1 and 2 through the handwritten font. After the answer string inputted by the user is identified, the accuracy of each answer character is determined and the wrong answer character is marked. Here, it is determined that the unit digit of the answer characters is wrong, and the wrong answer character is marked in the form of a dot (filled in the character filling cell with the incorrect character), and further, the correct answer character, i.e., character 1, is displayed in the lower right corner of the character filling cell with the incorrect character. In this manner, the user can easily see the error, thereby saving the user's time.

Example 6

As shown in FIG. 13 and FIG. 14, a calculation question: 111×32 is provided. After the type and content of the calculation question are identified, the calculation question: vertical calculation formula of 111×32 is generated below the calculation question. In this embodiment, only the vertical calculation formula is listed, and an area below the vertical calculation formula serves as the answer area configured to receive the step string and the result string inputted by the user. Here, the user inputs three rows of answer characters through print font, which are answer characters 2, 2, 2 in the first row (the row that is the closest to the vertical calculation formula), answer character 3, 3, 3 in the second row (the row below the first row), and answer characters 3, 5, 5, 2 in the third row (the row below the second row), respectively. After the answer string inputted by the user is identified, the accuracy of each answer character is determined according to the form of the vertical calculation. Here, the answer characters of the three rows are all correct, that is, the answer string for the calculation question is correct. In the embodiment of the present application, the answer characters that are all correct are not marked. In other embodiments of the present application, the answer characters that are all correct (i.e., the answer characters inputted for one calculation question are all correct) can be marked, for example, in the form of a check, thereby clearly showing that the answer characters of the calculation question is subjected to review (subjected to judgment), and the result is all correct, so that the user can easily see the result.

Example 7

As shown in FIG. 15 and FIG. 16, a calculation question: 21×42 is provided. After the type and content of the calculation question are identified, an answer area is formed on the right side and lower side of the calculation question. In this embodiment, the user inputs an answer string on the right side and the lower side of the calculation question, respectively. Specifically, the result string 8, 8, 3 is input on the right side of the calculation question. A step string and a result string are input on the lower side of the calculation question, wherein the input step string includes a step number string and a step operator string, and a vertical calculation formula is formed when the step string is input. Specifically, five rows of answer characters are input on the lower side of the calculation question, which are answer characters 2 and 1 in the first row, answer characters x, 4, 2 in the second row, answer characters 4 and 2 in the third row, answer characters 8 and 4 in the fourth row, answer characters 8, 8, 3 in the fifth row.

After the answer string inputted by the user is identified, the accuracy of each answer character is determined and the wrong answer character is marked. Here, it is determined that the unit digit of the result characters is wrong, and the wrong result character is marked by a circle, and further, the correct answer character, i.e., character 2, is displayed in the lower right corner of the result character with error. In this manner, the user can easily see the error, thereby saving the user's time.

In summary, in the calculation practicing method, the system, the electronic device and the computer readable storage medium provided in the embodiments of the present disclosure, the calculation practicing method includes: providing a calculation question; identifying the type and content of the calculation question; generating an answer area according to the type and content of the calculation question; receiving an answering operation in which the user inputs the answer string for the calculation question in the answer area; identifying the answer string inputted by the user; and determining whether each of the answer characters in the answer string is correct, if there is an incorrect answer character, the incorrect answer character will be marked, so that the calculation practice can be realized through the electronic device, which is convenient for students to carry out training. Meanwhile, by determining whether each of the answer characters in the answer string is correct, if there is an incorrect answer character, it is marked, which is convenient for students to understand the result of the calculation practice as soon as possible, and in addition, since teachers do not need to perform manual correction, the burden on teachers is also reduced.

The above description is only related to the preferred embodiments of the present invention, and is not intended to limit the scope of the present invention. Any changes and modifications made by those skilled in the art in light of the above disclosure are all within the scope of the appended claims.

What is claimed is:

1. A calculation practicing method, the calculation practicing method comprising:
   providing a calculation question;
   identifying the type and the content of the calculation question by a question identifying model, which is trained by using picture samples;
   displaying an answer area according to the type and the content of the calculation question by a display; wherein the answer area comprises a certain number of character filling cells according to the type and the content of the calculation question, and the number of the character filling cells is the same as the number of characters of correct answer string;
   receiving an answering operation in which a user inputs an answer string for the calculation question in the answer area;
   identifying the answer string inputted by the user; and
   determining whether each answer character in the answer string is correct, and if there is an incorrect answer character, marking the incorrect answer character by a mark, wherein the mark is shown beside the incorrect answer character.

2. The calculation practicing method according to claim 1, wherein if there is the incorrect answer character, a correct answer character is also displayed when marking the incorrect answer character.

3. The calculation practicing method according to claim 1, wherein after identifying the type of the calculation question, the calculation practicing method further comprises:
   determining whether it is necessary to generate a vertical calculation formula according to the type and the content of the calculation question, and if the vertical calculation formula needs to be generated, generating the vertical calculation formula beside the calculation question.

4. The calculation practicing method according to claim 3, wherein the generating the answer area according to the type and the content of the calculation question comprises: generating one result row, or one result row and at least two step rows beside the vertical calculation formula according to the type and the content of the calculation question and the generated vertical calculation formula;
   the result row comprising a certain number of character filling cells, and the number of cells of the character filling cells is determined according to the type and the content of the calculation question; the step row comprising a certain number of character filling cells, and the number of cells of the character filling cells is determined according to the type and the content of the calculation question; the number of rows of the step row is determined according to the type and the content of the calculation question.

5. The calculation practicing method according to claim 4, wherein each of the character filling cells is presented in the form of a box or a horizontal line.

6. The calculation practicing method according to claim 1, wherein the question identifying model is a neural network model established through pre-training with samples.

7. The calculation practicing method according to claim 1, wherein before providing the calculation question, the calculation practicing method further comprises:
   providing a calculation question upgrade path, the calculation question upgrade path comprising multiple levels;
   wherein, in the step of providing the calculation question, the calculation question provided is a calculation question in a current level.

8. The calculation practicing method according to claim 7, wherein in the calculation question upgrade path, a first level has been opened, and the opening of the next level requires completion of the previous level; in the current level, if the number of answer errors reaches a certain number, the number of calculation questions of the current level is automatically increased.

9. The calculation practicing method according to claim 8, wherein the user can select a level of questions to be answered before the calculation question is provided, and if the number of answer error reaches a certain number in the selected level, the user is automatically brought to the current level.

10. The calculation practicing method according to claim 7, wherein when the calculation question is provided, an answer score of the current level is simultaneously provided.

11. The calculation practicing method according to claim 1, wherein when the calculation question is provided, the number of calculation questions to be completed is simultaneously provided.

12. The calculation practicing method according to claim 1, wherein when receiving the answering operation in which the user inputs the answer string for the calculation question in the answer area, the time for the user to complete the operation is simultaneously provided; or when receiving the answering operation in which the user inputs the answer string for the calculation question in the answer area, the time for the user to perform the operation is limited.

13. The calculation practicing method according to claim 1, wherein in the step of providing the calculation question, the calculation question is provided by randomly generating a calculation question or randomly extracting a calculation question from a question bank.

14. The calculation practicing method according to claim 1, wherein the answer string inputted by the user is a print font or a handwritten font.

15. The calculation practicing method according to claim 14, wherein a first character identifying model is used to identify the printed font, and a second character identifying model is used to identify the handwritten font, the first character identifying model and the second character identifying model are respectively a neural network model established through pre-training with samples.

16. A calculation practicing system, the calculation practicing system comprising:
a question providing module, wherein the question providing module is configured to provide a calculation question;
a question identifying module, wherein the question identifying module is configured to identify the type and the content of the calculation question, and the question identifying module is trained by a question identifying model, which is trained by using picture samples;
an answer area generating module, wherein the answer area generating module is configured to generate an answer area according to the type and the content of the calculation question; wherein the answer area comprises a certain number of character filling cells according to the type and the content of the calculation question, and the number of the character filling cells is the same as the number of characters of correct answer string;
a touch display, wherein the touch display is configured to receive an answering operation in which a user inputs an answer string for the calculation question in the answer area, and the touch display is configured to display the answer area;
an answer identifying module, wherein the answer identifying module is configured to identify the answer string inputted by the user; and
a determining module, wherein the determining module is configured to determine whether each answer character in the answer string is correct, and if there is an incorrect answer character, marking the incorrect answer character by a mark, wherein the mark is shown beside the incorrect answer character.

17. The calculation practicing system according to claim 16, wherein the calculation practicing system further comprises: a question checking module, wherein the question checking module is configured to determine whether it is necessary to generate a vertical calculation formula according to the type and the content of the calculation question, if it is necessary to generate the vertical calculation formula, generating the vertical calculation formula beside the calculation question.

18. An electronic device, the electronic device comprising: a processor, a memory, and a display;
the memory being configured to store a computer program;
the processor being configured to execute the computer program; and
the display being configured to display results of executing the computer program,
wherein the processor is further configured to perform the following operations:
providing a calculation question;
identifying the type and the content of the calculation question by a question identifying model, which is trained by using picture samples;
displaying an answer area according to the type and the content of the calculation question by the display; wherein the answer area comprises a certain number of character filling cells according to the type and the content of the calculation question, and the number of the character filling cells is the same as the number of characters of correct answer string;
receiving an answering operation in which a user inputs an answer string for the calculation question in the answer area;
identifying the answer string inputted by the user; and
determining whether each answer character in the answer string is correct, and if there is an incorrect answer character, marking the incorrect answer character by a mark, wherein the mark is shown beside the incorrect answer character.

* * * * *